US012594208B2

(12) United States Patent
How

(10) Patent No.: US 12,594,208 B2
(45) Date of Patent: Apr. 7, 2026

(54) ENVIRONMENTALLY FRIENDLY AND QUICKLY ASSEMBLED FLAT PACK COFFIN

(71) Applicant: Oasis Transformation Trading Company Limited, Stourbridge (GB)

(72) Inventor: David Micah How, Buckingham (GB)

(73) Assignee: Oasis Transformation Trading Company Limited, Stourbridge (GB)

( * ) Notice: Subject to any disclaimer, the term of this patent is extended or adjusted under 35 U.S.C. 154(b) by 0 days.

(21) Appl. No.: 18/728,354

(22) PCT Filed: Jan. 10, 2023

(86) PCT No.: PCT/EP2023/050437
§ 371 (c)(1),
(2) Date: Jul. 11, 2024

(87) PCT Pub. No.: WO2023/135125
PCT Pub. Date: Jul. 20, 2023

(65) Prior Publication Data

US 2025/0082533 A1 Mar. 13, 2025

(30) Foreign Application Priority Data

Jan. 13, 2022 (GB) ...................................... 2200406

(51) Int. Cl.
*A61G 17/007* (2006.01)
*A61G 17/00* (2006.01)
*A61G 17/04* (2006.01)

(52) U.S. Cl.
CPC ....... *A61G 17/0106* (2017.05); *A61G 17/004* (2016.11); *A61G 17/0405* (2017.05);
(Continued)

(58) Field of Classification Search
CPC .. A61G 17/00; A61G 17/007; A61G 17/0106; A61G 17/044; A61G 17/041;
(Continued)

(56) References Cited

U.S. PATENT DOCUMENTS 427,760 A * 5/1890 Grueninger ........ A61G 17/0076 27/3
976,213 A * 11/1910 Pye et al. ............... A61G 17/00 27/35
(Continued)

FOREIGN PATENT DOCUMENTS

CN 112137824 A * 12/2020 ........... A61G 17/042
DE 29919680 U1 * 1/2000 ......... A61G 17/0405
(Continued)

*Primary Examiner* — William L Miller
(74) *Attorney, Agent, or Firm* — LaMorte & Associates, P.C.

(57) ABSTRACT

The invention provides a flat-pack coffin made of environmentally friendly materials, the coffin comprising a lid, left- and right-hand side panels, head and foot end panels and a base assembly, wherein each right- and left-hand side panel independently has a top edge, a bottom edge, a head end edge and a foot end edge, each side panel independently being provided with a plurality of downwardly extending locking protrusions on the bottom edge for insertion into the base assembly and a slot on each end edge for accepting a connector from an end panel; wherein each foot and head end panel independently has a top edge, a bottom edge, an interior face and an exterior face, each end panel independently being provided with a plurality of downwardly extending protrusions on the bottom edge for insertion into the base assembly and connectors on the interior face for insertion into the slots in the side panels so as to secure the end panels to the side panels; and wherein the base assembly comprises a layer of base slats, and a padded layer on top of the base slat layer to form a resting surface for a corpse,
(Continued)

wherein the resting surface has upstanding edges defining a rim around the perimeter thereof, the rim having a first plurality of apertures for accepting the downwardly extending protrusions of the end panels and a second plurality of apertures for accepting the locking protrusions of the side panels so as to secure the side panels to the base assembly.

11 Claims, 15 Drawing Sheets

(52) U.S. Cl.
CPC .......... *A61G 17/041* (2016.11); *A61G 17/044* (2016.11); *A61G 2203/90* (2013.01)

(58) Field of Classification Search
CPC .............. A61G 17/004; A61G 17/0405; A61G 2203/90; B65D 9/12
See application file for complete search history.

(56) References Cited

U.S. PATENT DOCUMENTS

| | | | | | |
|---|---|---|---|---|---|
| 2,162,137 | A * | 6/1939 | Torricelli | E04H 13/00 52/142 |
| 3,879,818 | A * | 4/1975 | Rowland | A61G 17/0136 27/7 |
| 4,146,948 | A * | 4/1979 | Royce | A61G 17/007 27/5 |
| 4,800,631 | A * | 1/1989 | Pellmann | A61G 17/0136 27/7 |
| 5,964,014 | A * | 10/1999 | Wang | A61G 17/004 27/10 |
| 6,018,853 | A * | 2/2000 | Chen | A61G 17/004 27/4 |
| 6,497,018 | B1 * | 12/2002 | Chiu | A61G 17/004 220/4.28 |
| 7,761,963 | B2 * | 7/2010 | Koch | B65D 11/1873 27/35 |
| 9,603,766 | B2 * | 3/2017 | Mitchell | A61G 17/0106 |
| 9,763,844 | B2 * | 9/2017 | Krinsky | A61G 17/0073 |
| 12,193,976 | B1 * | 1/2025 | Brinkley-Strickland | A61G 17/0073 |
| 12,364,638 | B2 * | 7/2025 | Sanchez Zequera | A61G 17/044 |
| 2007/0261219 | A1 | 11/2007 | Koch et al. | |
| 2008/0034562 | A1 * | 2/2008 | Wensley | A61G 17/02 27/3 |
| 2010/0263177 | A1 * | 10/2010 | Abayhan | A61G 17/0106 27/7 |
| 2012/0060334 | A1 * | 3/2012 | Gesell | A61G 17/004 27/4 |
| 2015/0173989 | A1 * | 6/2015 | Mitchell | B65D 9/12 220/4.28 |
| 2017/0246067 | A1 * | 8/2017 | Kan | A61G 17/0106 |
| 2020/0206057 | A1 * | 7/2020 | Wainman | A61G 17/042 |
| 2023/0390138 | A1 * | 12/2023 | Davis | A61G 17/007 |
| 2024/0000645 | A1 * | 1/2024 | Sanchez Zequera | A61G 17/02 |
| 2025/0161134 | A1 * | 5/2025 | Recchioni | A61G 17/0136 |

FOREIGN PATENT DOCUMENTS

| | | | | |
|---|---|---|---|---|
| EP | 1625840 A2 * | 2/2006 | A61G 17/0073 |
| GB | 2423076 | 8/2006 | |
| JP | 2002320653 A * | 11/2002 | |
| WO | WO-2009051565 A1 * | 4/2009 | A61G 17/0106 |
| WO | WO-2022113026 A1 * | 6/2022 | A61G 17/024 |
| WO | WO-2023139456 A1 * | 7/2023 | A61G 17/04 |

* cited by examiner

ENVIRONMENTALLY FRIENDLY AND QUICKLY ASSEMBLED FLAT PACK COFFIN

The present invention relates to an environmentally friendly coffin suitable for use in both land burials and cremation, in particular to a quickly assembled flat-packed coffin made of bamboo and jute.

BACKGROUND TO THE INVENTION

Coffins are culturally significant with shape in particular playing an important part. In most markets volume is at the lower price points. Typically, these are traditional particle board coffins containing resins and timber "foil" finish, or pine or *paulownia* timber. Transportation costs are high for such coffins if shipped empty. Attempts to lower transportation costs by nesting or filling coffins with other items such as fabric or other smaller products do improve costs somewhat, however, containers still contain a significant amount of unused space.

The negative impact on the environment made by land burials has long been recognised and environmentally friendly coffins, for example made from biodegradable materials such as corrugated cardboard or sustainable materials such as, but not limited to, bamboo, willow, grasses, banana leaf, rattan, raffia, sisal, jute, vetiver, *pandanus*, wicker, seagrass, and water hyacinth, are becoming ever more popular. Some eco-coffins often have a basket appearance rather than a coffin appearance and can be expensive to weave. Whilst such coffins can be nested, unused space remains in the transportation container after nesting.

GB2538767 discloses a coffin designed to speed up decomposition of the corpse, the coffin comprising a plurality of panels mounted in apertures formed by a framework of rigid struts, at least one of the struts including a groove in which the panel is releasably mounted, arranged such that external pressure from soil collapses in the panel and introduces soil to the interior.

EP2563311 discloses a coffin in an environmentally friendly material such as pulp or a more specifically defined paper pulp and having vertical recesses directed inwards, which cover both the coffin box and the lid, and transverse levers or pipes at each side of the coffin box bottom across each recess to improve strength and stability in the load-bearing parts.

These prior art coffins do not solve the problem of minimising transportation costs whilst also providing for quick and easy coffin assembly.

It is therefore an object of the present invention to provide an environmentally friendly coffin suitable for use in both land burials and cremation which alleviates the above disadvantages, or at least provides a suitable alternative.

SUMMARY OF THE INVENTION

The present invention relates to an environmentally friendly and quickly assembled flat-packed coffin suitable for use in both land burials and cremation.

Use of the term "coffin" herein is not limited to burial or cremation containers of a particular shape. The term "coffin" is used herein to refer to any and all shapes of burial or cremation container including, but not limited to, caskets.

Accordingly, in a first aspect the invention provides a flat-pack coffin made of environmentally friendly materials, the coffin comprising:

a lid;

a right-hand side panel;

a left-hand side panel;

a foot end panel;

a head end panel; and a base assembly;

wherein each right- and left-hand side panel independently has a top edge, a bottom edge, a head end edge and a foot end edge, each side panel independently being provided with a plurality of downwardly extending locking protrusions on the bottom edge for insertion into the base assembly and a slot on each end edge for accepting a connector from an end panel;

wherein each foot and head end panel independently has a top edge, a bottom edge, an interior face and an exterior face, each end panel independently being provided with a plurality of downwardly extending protrusions on the bottom edge for insertion into the base assembly and connectors on the interior face for insertion into the slots in the side panels so as to secure the end panels to the side panels; and wherein the base assembly comprises:

a layer of base slats, and a padded layer on top of the base slat layer to form a resting surface for a corpse, preferably wherein the two layers together are covered in fabric, wherein the resting surface has upstanding edges defining a rim around the perimeter thereof, the rim having a first plurality of apertures for accepting the locking protrusions of the side panels so as to secure the side panels to the base assembly and a second plurality of apertures for accepting the downwardly extending protrusions of the end panels.

The coffin according to the invention flat packs efficiently from a space-optimised stack of panels to maximise container packing and can be assembled without the use of tools other than a hammer by one person in under 3 minutes. Due to the lack of screws, nails or other metal components, there is no metal cremation waste.

In a preferred embodiment, the lid, side and end panels each independently comprise a fabric cover stretched over a frame of interconnected members made of sustainable material such as bamboo. However, this is not considered to be limiting and other materials such as, for example, pine, *paulownia* or other timbers may be used for the frame. The fabric cover is preferably made of cloth selected from among, but not limited to, jute, cotton, bamboo fabric, or mixes thereof such as a jute/cotton mix or bamboo/cotton mix.

The frame members of each frame are preferably spliced together, fastened with a locking member such as a bamboo pin, and glued. The fabric cover is then stretched over the frame, covering both sides of the frame, and glued into place. The fabric is preferably stretched using canvas pliers to get it tight and is subsequently locked into place, e.g. with PVA glue at the edges.

Depending on the desired shape of the coffin, the frames may be rectangular, truncated triangular, square, U-shaped, oval or other. If the coffin is to be of the traditional British shape, i.e., hexagonal shaped, tapering from the shoulders to the feet, each side panel comprises two frames within the fabric cover, preferably a square frame and a rectangular frame of the same height, such that the fabric cover acts as a hinge to allow the two frames to flex relative to each other for flat packing.

The base slats of the base assembly are preferably made of sustainable material such as bamboo. However, this is not considered to be limiting and other materials such as, for example, pine, *paulownia* or other timber may be used. The base slats are preferably bonded together with marine PVA glue, and particularly preferably also covered with a fine layer of marine PVA glue, i.e., a layer in a thickness of about 0.1 mm to about 0.3 mm.

Fabric is preferably laid over or fixed to the base slats. In a preferred embodiment, fabric is stretched over the base slats and glued in place. Alternatively, or additionally, fabric is fixed to the base slats by pins, preferably made of sustainable material such as bamboo.

The padded layer preferably comprises cross member slats and longitudinal slats locked together with pins made of sustainable material such as bamboo and interspersed with filled fabric, e.g., jute, bags. The filling is preferably sawdust, fabric or other soft natural material, particularly preferably waste soft material such as fabric cuttings. However, this is not considered to be limiting and padding other than filled bags may be interspersed between the slats.

Fabric is preferably laid over or fixed to the resting surface. In a preferred embodiment, fabric is stretched over the cross member slats and longitudinal slats of the padded layer and glued in place. Alternatively, or additionally, fabric is fixed to the slats by pins, preferably made of sustainable material such as bamboo.

The rim of the base assembly is preferably made of sustainable material such as bamboo However, this is not considered to be limiting and other materials such as, for example, pine, *paulownia* or other timber may be used. The rim is preferably attached to the perimeter of the base assembly resting surface with bamboo pins and marine glue.

The preferred embodiment of the combination of the fine layer of marine PVA glue on the base slates, the filled fabric bags in the padded layer and the fabric covering of the resting surface aids to ensure there are no leaks from the coffin when in use.

In a preferred embodiment, each of the plurality of downwardly extending locking protrusions on the bottom edge of the side panels independently comprise a laterally extending nub, preferably in the shape of a circular dowel. In this embodiment, the first plurality of apertures on the base assembly rim for accepting the locking protrusions of the side panels have a stepped cross-sectional internal profile such that the aperture narrows from the top to the bottom at one end and widens from the top to the bottom at the other end. In this embodiment, the aperture narrows from one end to the other when viewed from above and narrows in the opposite direction when viewed from below, particularly preferably wherein the apertures on the base assembly rim for accepting the locking protrusions are substantially cruciform shaped when viewed from above and cricket bat-shaped when viewed from below.

On initial insertion of the locking protrusions into the apertures, each nub fits into the wider portion of a corresponding aperture. As a result of the internal profile of the aperture, on pushing the side panel with inserted locking protrusions towards one end of the coffin, e.g., the head end or foot end of the coffin, the locking protrusions lock the side panel into place, avoiding unwanted disassembly.

Each side panel preferably has four downwardly extending locking protrusions and the base assembly rim preferably has eight corresponding apertures for accepting the locking protrusions of the side panels.

The base assembly preferably further comprises handles, particularly preferably fabric handles, e.g., in the form of rope handles made from multiple strands of jute. In a preferred embodiment, the handles are held in place on the base assembly with string such as jute string.

There are preferably six handles on the base assembly, three either side. In a preferred embodiment, there are a further two handles, one at the head, and one at the foot of the coffin. However, this is not considered to be limiting and any suitable number of handles may be used.

A loop of jute rope string preferably runs through the rim of the base assembly such that the loop can be pulled out and snapped over a handle to move the handle to a more upright position for convenient use. The handles thus pull up into place after coffin assembly to "offer" to a person carrying the coffin.

One or more fabric straps, e.g., jute fabric straps, are preferably woven through the layer of base slats of the base assembly for attachment to the optional handles and to further strengthen the base of the coffin. In a particularly preferred embodiment, the or each strap runs through the inside of a handle and forms an unbroken loop for strength.

Lateral grooves for the straps are preferably routed into the underside of the base assembly after attachment of the rim.

In a preferred embodiment, there is a single downwardly extending protrusion located at each corner of the bottom edge of each of the head and foot end panels and at least one downwardly extending protrusion located in the centre of the bottom edge of each of the head and foot end panels, preferably wherein the corner protrusions are cylindrical, i.e., in the shape of locator pins, and the central protrusions are provided with a hole for accepting fastening means, particularly preferably wherein the base assembly rim also has holes for accepting fastening means, said holes being orthogonal to the apertures for accepting the central protrusions. In this way, when the end panels sit into place, the holes in the end of the base and the holes in the end panel downward protrusions are aligned and fastening means, preferably bamboo pins, can be hammered into place.

The connector on each end panel independently is preferably in the form of a hook, particularly preferably a hook made from two layers of sustainable material such as bamboo with the grains at 90 degrees to each for strength. Each hook preferably has a tapered inside so that when the hook is entered into the slot on side panel and the end panels are pushed down into place in the base assembly, the end panel and side panels pull together such that the end panels are pulled in tightly towards the side panels. Preferably, the hook is tapered such that the nominal angle is in the range of from about 15 degrees to about 35 degrees to the vertical, e.g., 24 degrees to the vertical.

In a preferred embodiment, the exterior surface of the lid comprises one or more washers, e.g., 8 washers, wherein each washer has a dip along its width. The washers preferably made of bamboo. A T-shaped toggle or toggles with the T-bar having an underside profile matching the dip in the washer is passed through the or each washer and hole in the lid into a hole in the top edge of the side frame. As the toggle is turned, preferably by a quarter turn, the bottom locks to the side panel and clamps the lid and side panel together. In its resting, unlocked, position, the underside profile rests in the dip of the washer.

For the lining of the coffin, multiple layers of jute fabric are preferably stretched over the base assembly to make the resting surface look like a flat mattress.

The coffin may be any shape capable of containing a cadaver including but not limited to a conventional coffin shape or a casket. Preferred coffin shapes include those having a lid and base assembly which is rectangular, oval, in the form of a truncated triangle, or a tapered hexagon.

The shape of the coffin according to the invention is preferably that of a tapered hexagon. This is not considered to be limiting and other coffin shapes may be used such as, for example, wedge shaped, curved or cuboid.

In the preferred embodiment, wherein the lid is a tapered hexagon, the end panels are square or rectangular and the side panels, when flat, are rectangular.

In the preferred embodiment, wherein the coffin is curved, the lid and base assembly have straight sides and curved ends, the end panels are U-shaped and the side panels are rectangular.

In the preferred embodiment, wherein the coffin is wedge-shaped, the lid, side panels and base assembly are each independently in the form of truncated triangles and the end panels are square or rectangular.

In the preferred embodiment, wherein the coffin is a cuboid, the lid, side panels and base assembly are rectangular and the end panels are square or rectangular.

The lid, side and end panels and base assembly are of minimum depth/thickness for efficient transport, preferably wherein each component independently is in the range of from about 20 mm to about 40 mm thick/deep, particularly preferably from about 25 mm to about 35 mm, e.g., 30 mm thick/deep.

To optimise packing, multiples of each panel are placed one on top of one another in a given stack. This is more efficient than a boxed single coffin with one of each component panel. Padding, e.g., bamboo sawdust filled sausage-shaped bags, is stored in the stack of components in spare space separately from pillow cases. The distributor in the destination country then packs these sausage-shaped bags into the pillow case to create a final pillow shape.

BRIEF DESCRIPTION OF THE DRAWINGS

Certain preferred embodiments of the present invention will now be described, by way of example only, with reference to the accompanying drawings in which.

DETAILED DESCRIPTION

Figure 1A:
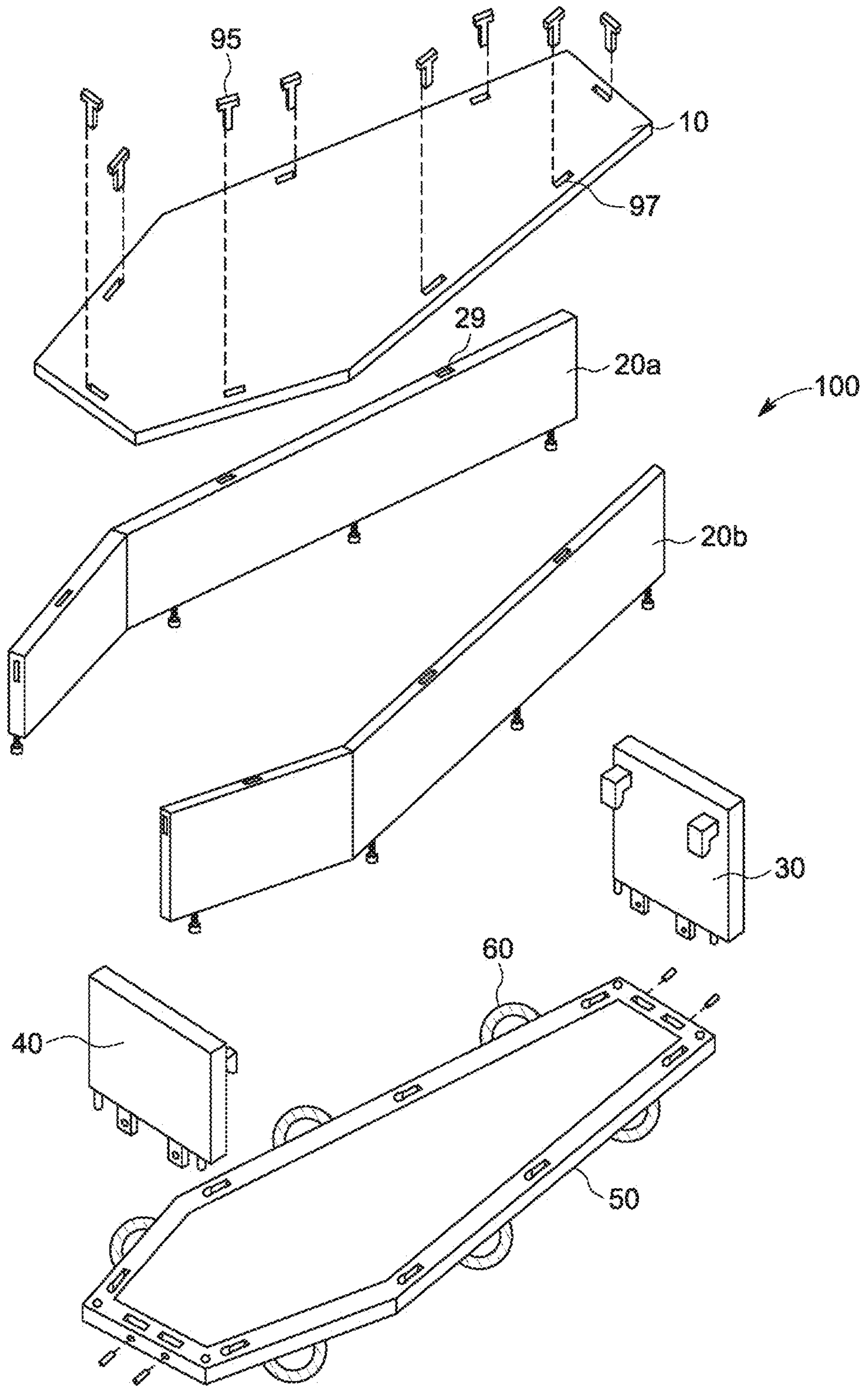
FIG. 1*a* shows an exploded perspective view of a preferred embodiment of the environmentally friendly flat-pack coffin according to the invention.

Various embodiments of the present invention will be described in detail with reference to the drawings, where like reference numeral represent like parts and assemblies throughout the several views.

Referring to the drawings and especially to FIGS. 1*a* to 10*b*, FIGS. 1*a* and 2*a* to 2*d* show a preferred environmentally friendly flat-pack coffin according to the invention, generally referred to herein by reference numeral 100 and comprising lid 10, right-hand side panel 20*a*, left-hand side panel 20*b*, foot end panel 30, head end panel 40 and base assembly 50 with handles 60.

In the embodiment shown in the Figures, lid 10, side panels 20*a*, 20*b* and end panels 30, 40 each independently comprise a jute fabric cover stretched over a bamboo frame (not shown). However, this is not considered to be limiting and other sustainable materials may be used.

The frame members of each bamboo frame are spliced together, fastened with a bamboo pin and glued. The fabric cover is then stretched over the frame, covering both sides of the frame, using canvas pliers to get it tight and is subsequently locked into place with PVA glue at the edges. Alternatively, the fabric is held tight by fittings such as retaining baton and bamboo bayonet fittings.

Figure 1B:
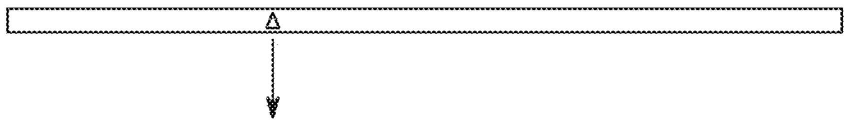
FIG. 1*b* shows a plan view of a side panel of the coffin of FIG. 1*a* flattened for packing for transport.
Figure 1C:
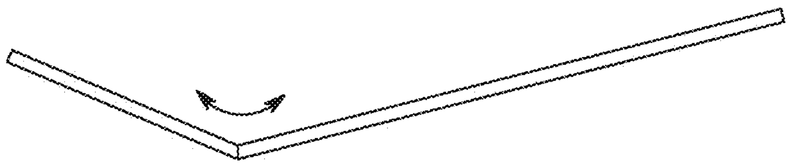
FIG. 1*c* shows a plan view of a side panel of the coffin of FIG. 1*a* bent for assembly.
Figure 2A:
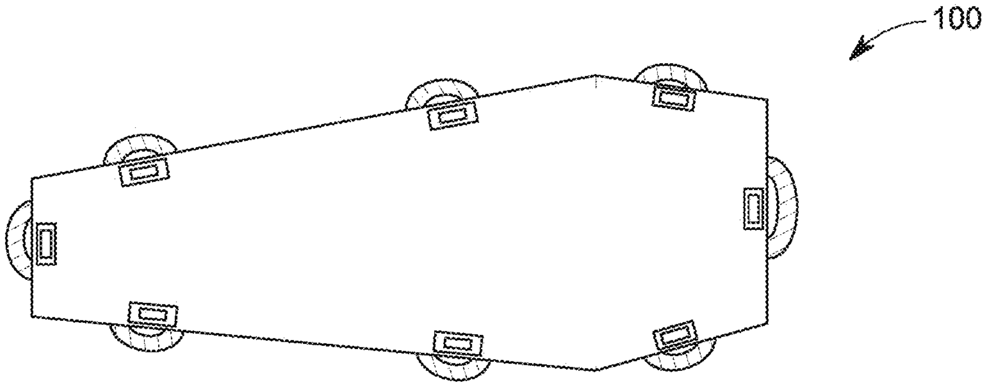
FIG. 2*a* shows a plan view of the coffin of FIG. 1*a;*
Figure 2B:
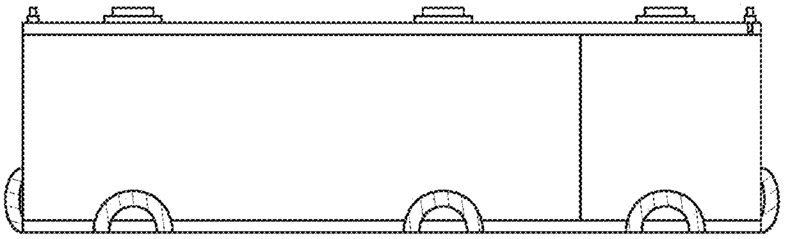
FIG. 2*b* shows a side view of the coffin of FIG. 1*a;*

As shown in FIGS. 1*a* and 2*a*, coffin 100 is in the shape of a tapered hexagon with lid 10 and base assembly 50 each independently in the shape of a tapered hexagon, end panels 30, 40 being rectangular. Side panels 20*a*, 20*b* are rectangular when flat 1*b* and in use are bent inwards at the head end of coffin 100 as shown in FIG. 1*a*. Plan views of a suitable side panel is shown in FIGS. 1*b* and 1*c*, wherein the side panel comprises two frames (not shown) within the fabric cover, a square frame and a rectangular frame of the same height, such that the fabric cover acts as a hinge to allow the two frames to flex relative to each other for flat packing.

Side panels 20*a*, 20*b* are each independently provided with four downwardly extending toe-like protrusions 21 for locking into base assembly 50 and slots 22 on each end edge for accepting hooks 33 from end panels 30, 40. Each toe 21 is provided with laterally extending nubs in the form of circular dowels 23.

Foot end panel 30 and head end panel 40 are each independently provided with downwardly extending protrusions 31, 32 on the bottom edge for insertion into base assembly 50 and hooks 33 on the interior face for locking into slots 22 in side panels 20*a*, 20*b*. The two protrusions 31 are cylindrical dowel locators and protrusions 32 are rectangular section feet, each with a small hole in the centre.

Hooks 33 are held onto end panels 30, 40 with marine PVA glue and strengthened by a bamboo pin. Each hook is made from two layers of bamboo pressed and glued together with the grains at 90 degrees to each other. This prevents stress at the inside corners of the hooks which could cause the hook to snap off.

Whilst the frames of lid 10, side panels 20*a*, 20*b*, and end panels 30, 40 are each independently covered with jute canvas cloth, protrusions 21, 31, 32 and hooks 33 are not covered by the fabric.

Figure 4:
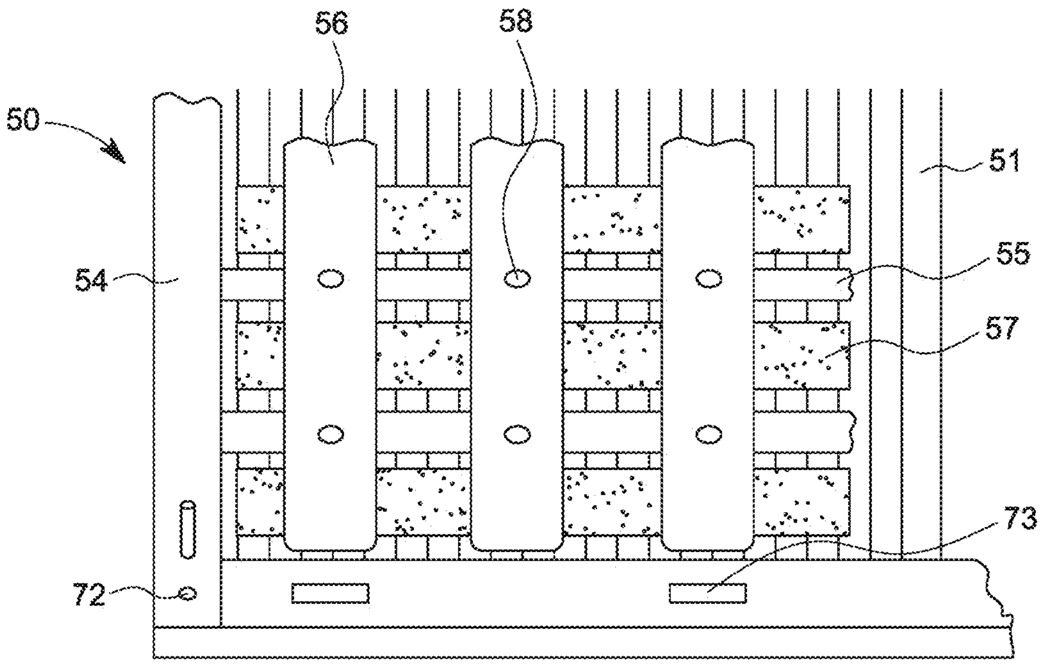
FIG. 4 shows the components of the base assembly of the coffin of FIG. 1*a;*

As shown in FIG. 4, base assembly 50 comprises a layer of base slats 51 with padded layer 52 on top of base slat layer 51. The underside of slats 51 is smooth and flat, whereas because the top side is unseen, it is permitted to be uneven, e.g., +/−2 mm. Layers 51, 52 are covered in jute fabric to form resting surface 53 for a corpse (not shown). That is, the resting surface of base assembly 50 is covered in fabric (not shown), e.g., jute fabric. Upstanding edges defining rim 54 around its perimeter are made of 12 mm wide and 4 mm deep bamboo strips and are on top of this fabric, bonded thereto with marine PVA glue.

Base assembly 50 is preferably formed according to the following steps:

- (i) slats 51 are laid parallel to each other to make a lower layer of base slats wherein slats 51 are preferably very long rectangles of bamboo material which are glued and pressed face to face across the width of the base;
- (ii) straps 59, preferably jute straps, are woven through this first layer;
- (iii) crossmember slats are laid parallel to each other to form a second layer across the width of the first layer;
- (iv) padding such as jute sawdust bags is placed in between the cross members;
- (v) a layer of longitudinal pieces is placed on top of these to complete padded layer 52;
- (vi) the layers are then pinned together, preferably with a tight fit bamboo peg with marine glue on the peg;
- (vii) layers of jute fabric are stretched across the whole base to create a slight soft/spongy feel to resting surface 53 like a hard mattress;
- (viii) raised perimeter frame 54 is added to the top of the above, preferably locked to the edges of the slats with bamboo pins and marine glue; and
- (ix) grooves (not shown) in the base are routed into the underside of the base.

Figure 8A:
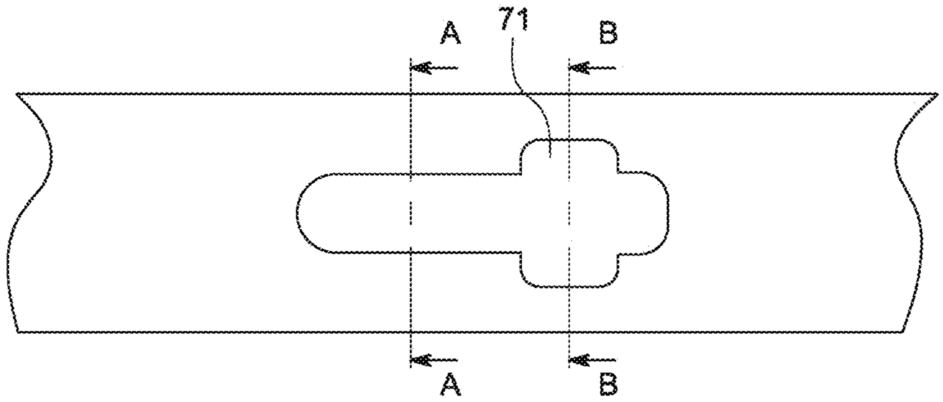
FIG. 8*a* shows a plan view of the keyhole slot shown in FIG. 5.
Figure 8B:
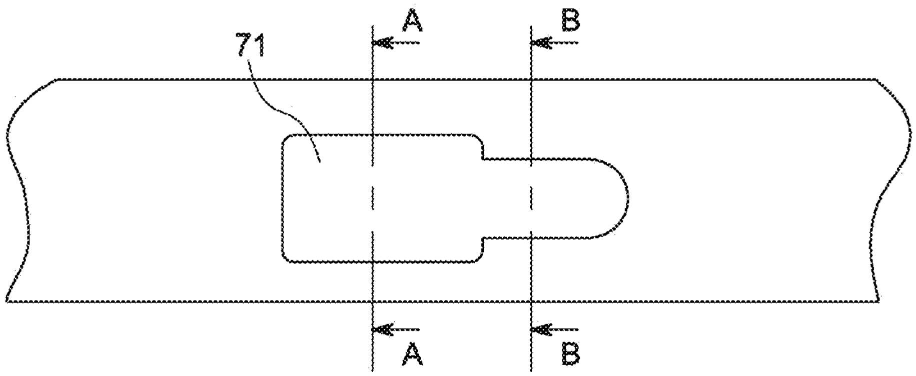
FIG. 8*b* shows a bottom view of the keyhole slot shown in FIG. 5.
Figure 8C:
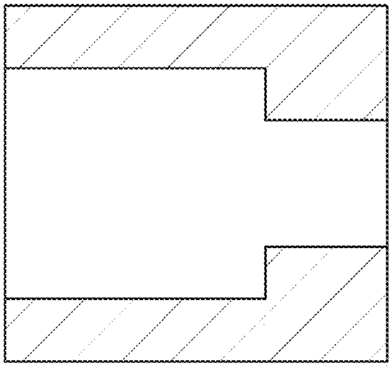
FIG. 8*c* shows a cross-sectional view along line A-A of the keyhole slot shown in FIG. 8*a;*
Figure 8D:
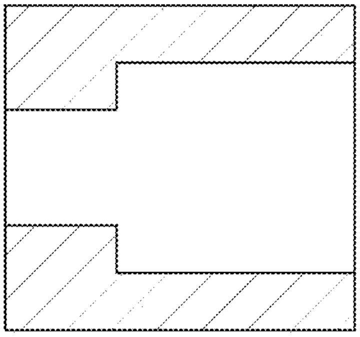
FIG. 8*d* shows a cross-sectional view along line B-B of the keyhole slot shown in FIG. 8*a;*
Figure 9B:
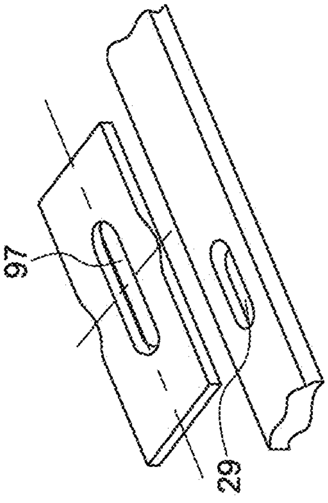
FIGS. 9*a* to 9*e* show details of a preferred toggle system used to connect the lid to the coffin shown in FIG. 1*a;*
Figure 9A:
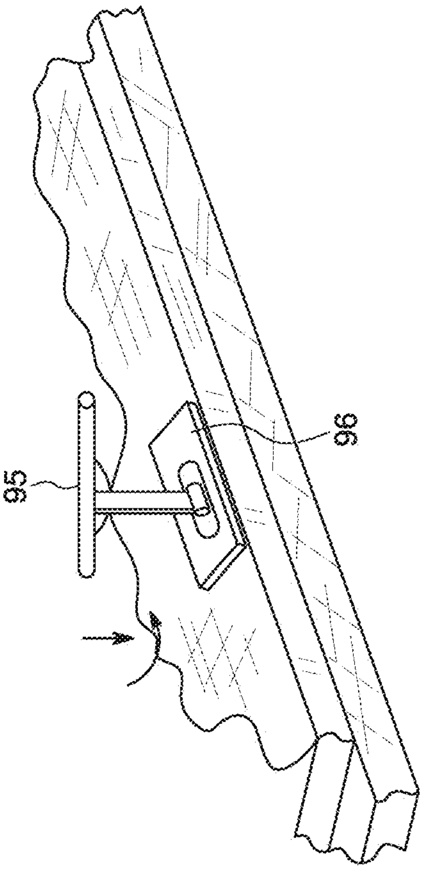
Figure 9D:
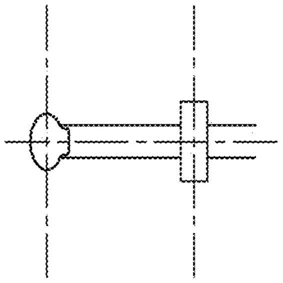
Figure 9C:
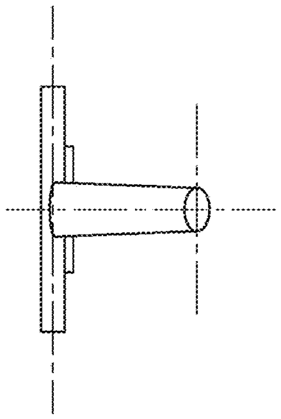
Figure 9E:
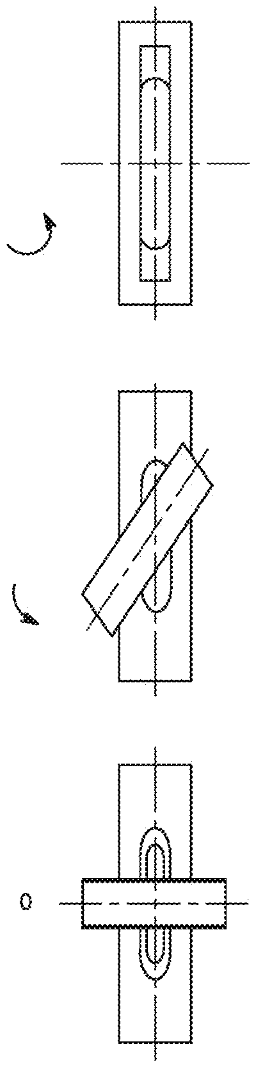
Figure 10A:
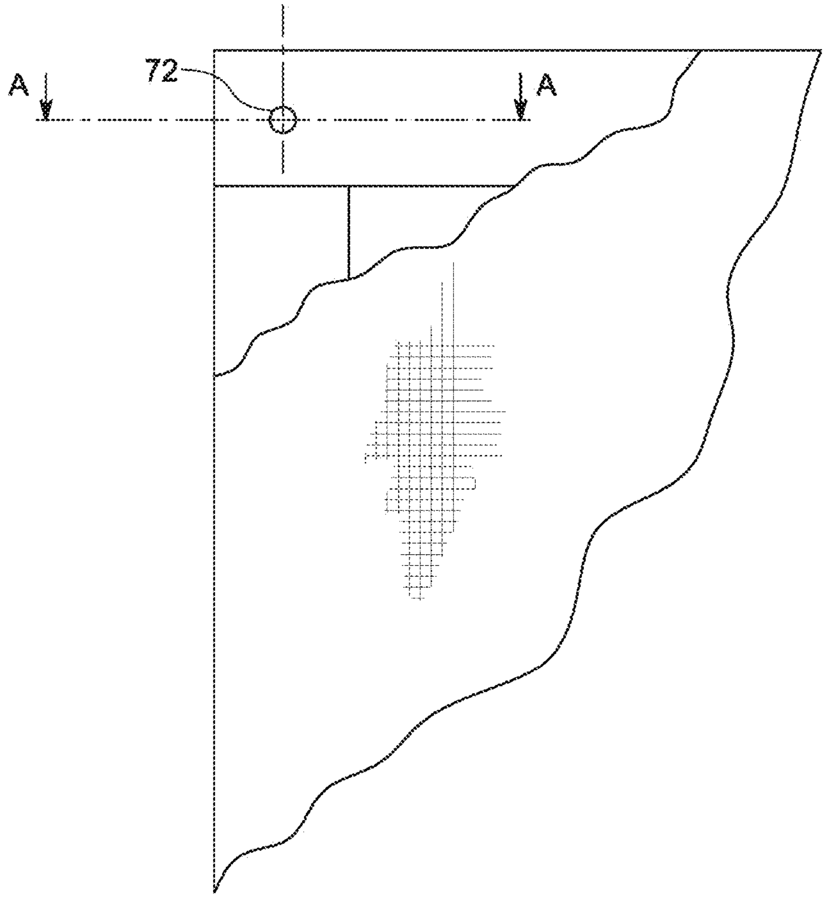
FIG. 10*a* shows details of frame constructions for the panels of the coffin of FIG. 1*a;*
Figure 10B:
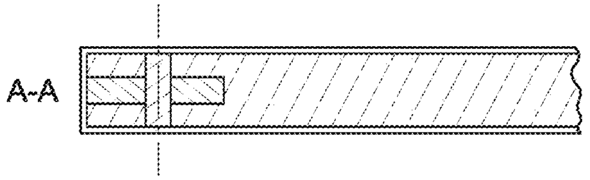
FIG. 10*b* shows a cross sectional view along line A-A in FIG. 10*a*.

There are eight cruciform shaped keyhole apertures 71 in rim 54 for accepting toes 21, four round locator holes 72 for accepting dowel locators 31 and four rectangular holes 73, two at each end, for accepting feet 32. Keyhole apertures 71 have a stepped cross-sectional internal profile such that the aperture narrows from the top to the bottom at one end and widens from the top to the bottom at the other end. This is shown more clearly in FIGS. 8*a* to 8*d*. FIG. 8*a* shows the cruciform shape of keyhole 71 when in plan view. FIG. 8*b* shows the cricket-bat or paddle shape of keyhole 71 when viewed from below. FIG. 8*c* is a cross-sectional view of the right-hand side portion (line A-A) of keyhole 71 shown in FIGS. 8*a* and 8*b*. FIG. 8*d* is a cross-sectional view of the left-hand side portion (line B-B) of keyhole 71 shown in FIGS. 8*a* and 8*b*.

Due to the fact that keyhole 71 is wider on one side, toe 21 can freely enter keyhole 71 upon pressing the side panel it is attached to down towards base assembly 50.

When toe 21 is in the right-hand side portion of keyhole 71 shown, it is in an unlocked position. When toe 21 is pressed down into keyhole 71 in this initial unlocked position, the fabric beneath it compresses in the range of from about 0.5 mm to about 2.0 mm. As the side panel is then pushed forward into the locked position, keyhole 71 is narrower in width and circular dowel 23 is then retained inside keyhole 71. That is, when toe 21 is in the left-side portion of keyhole 71 shown, it is in a locked position and secures the side panel to the base assembly. In its final resting location, the fabric relaxes again and friction between the fabric on the underside of the side panel and the bamboo/timber of the top surface of rim 54 helps to hold the side panel in its locked position. The toes 21 on each side panel and a slight "spring" in the frame by virtue of the bamboo result in tension between toes 21 which helps the side panel to lock into place.

The circular shape of dowel 23 assists in feeding toe 21 into the locked position and the friction on the top side of dowel 23 with the inside profile of keyhole 71 also helps to lock in place.

Figure 5:
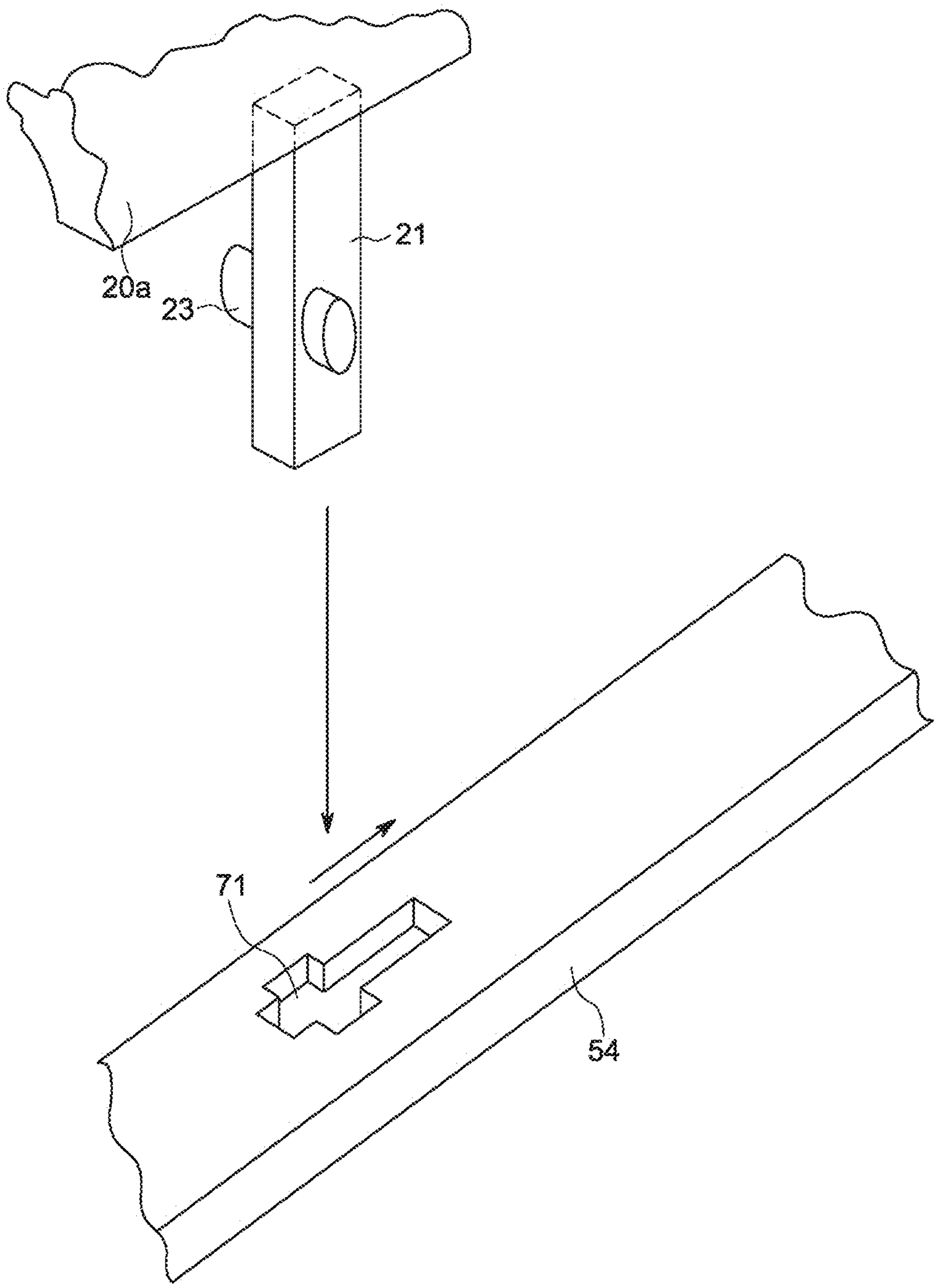
FIG. 5 shows a preferred protrusion and slot for connecting a side panel to the base assembly of the coffin of FIG. 1*a;*

As shown in FIG. 5, on insertion of toe 21 into keyhole slot 71, dowel locator 23 fits into the wider portion of slot 71. On pushing a side panel with inserted toes 21 towards the head end of coffin 100, each dowel 23 moves forward within the narrower portion of keyhole-shaped slot 71 and the side panel is locked into place, avoiding unwanted disassembly.

The base slat layer (not visible in the Figures) is preferably made of 134 pieces of bamboo strips 51 bonded together with marine PVA glue.

Padded layer 52 has cross members 55 and longitudinals 56 surrounding "sand sausages" 57 made from sawdust and jute bags. Cross members 55 and longitudinals 56 are locked together with bamboo pins 58 and secured with marine PVA glue. Each pin is 5 mm in diameter and 35 mm long. Fabric skins (not shown in FIG. 9) are fixed to base slats by X pins (not shown). Each pin is 5 mm in diameter and 35 mm long.

Figure 6:
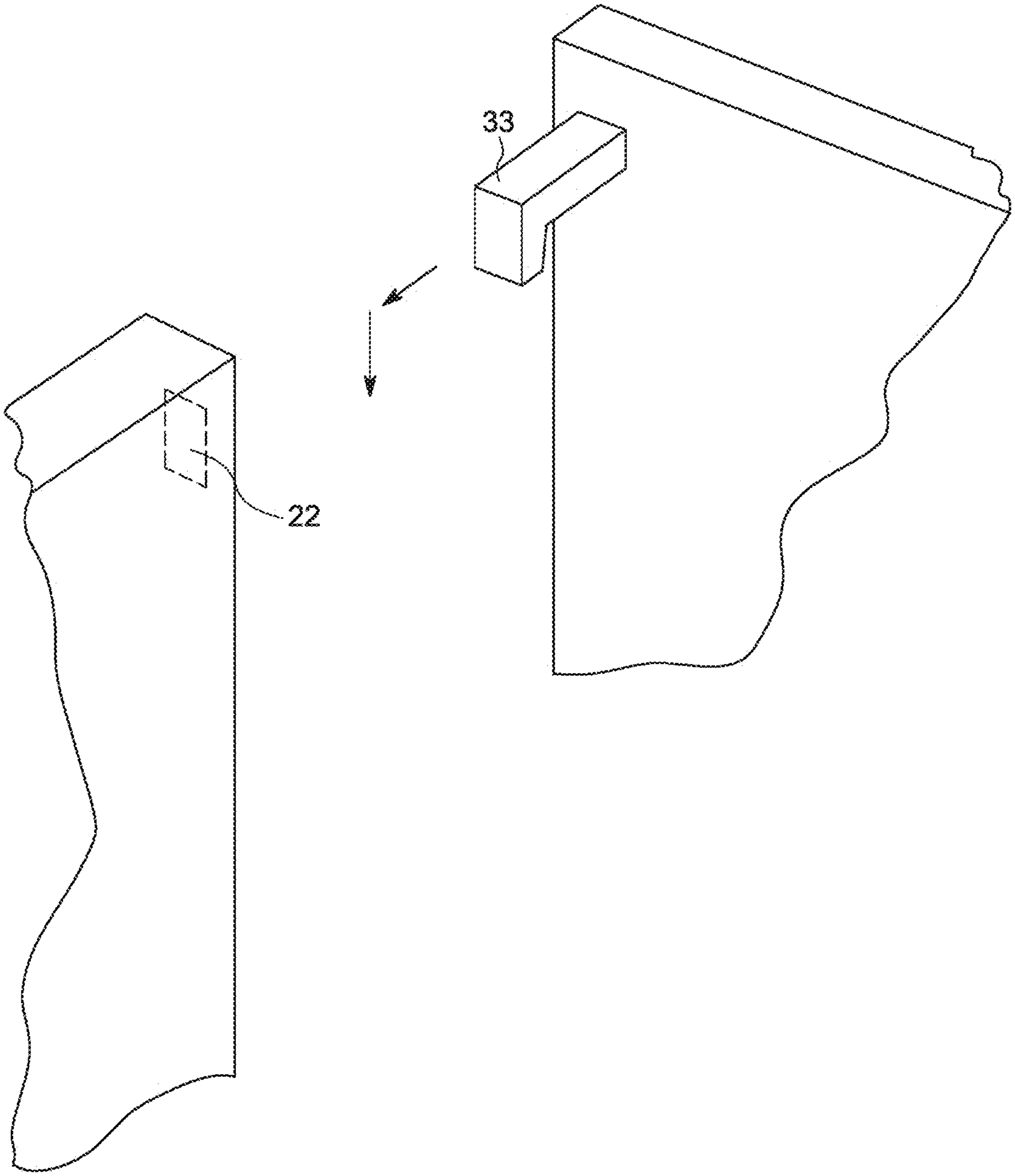
FIG. 6 shows a preferred hook for connecting an end panel to a side panel of the coffin of FIG. 1*a;*
Figure 7:
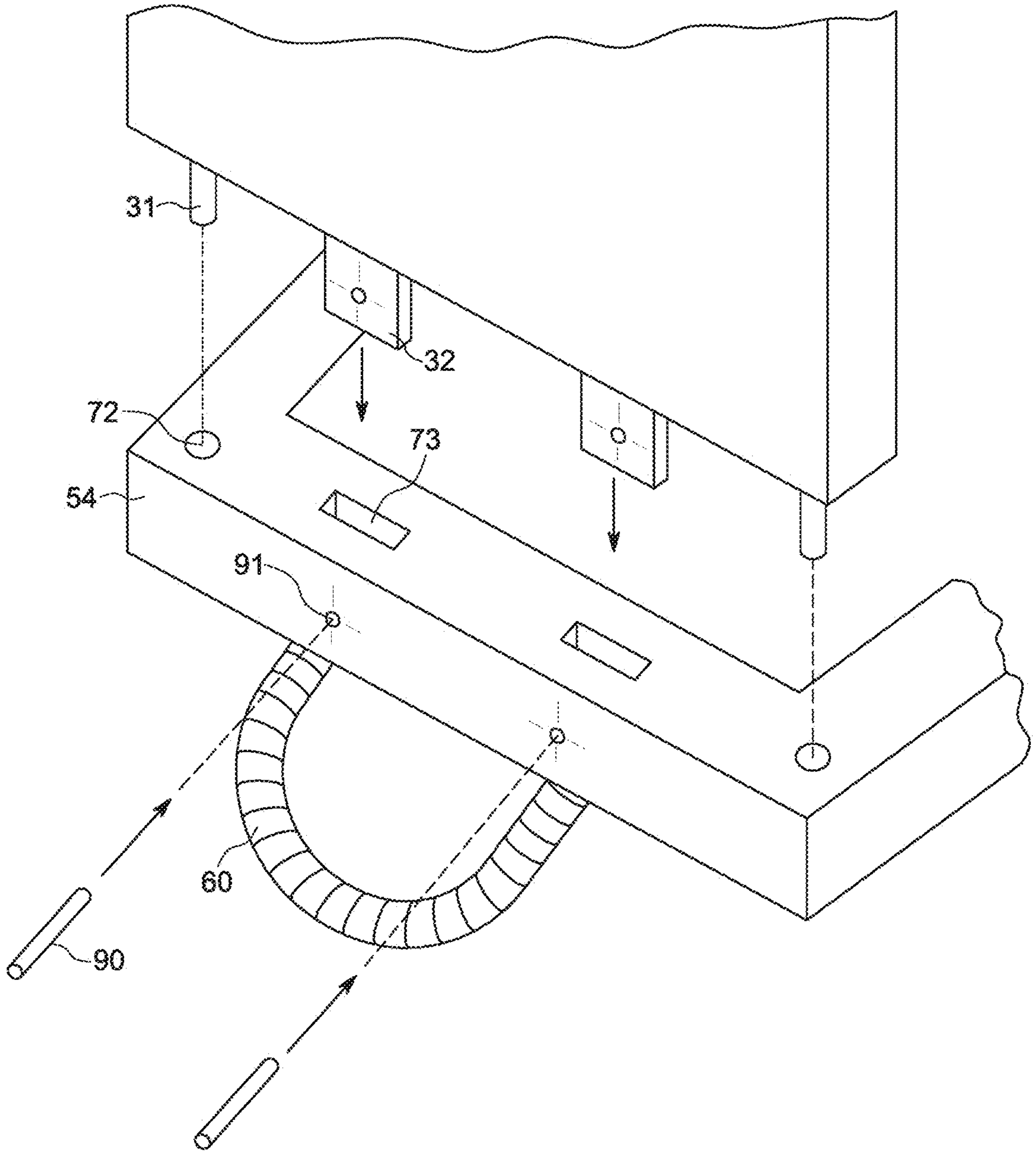
FIG. 7 shows an enlarged view of the end panel and base assembly of the coffin of FIG. 1*a;*

As shown in FIG. 6, hooks 33 on end panels 30, 40 are shaped such that as the hook is pressed into slot 22 on side panel 20*a* or 20*b*, it pulls end panel 30 or 40 in tight to the side panels 20*a*, 20*b*. At the same time, protrusions 31, 32 on the bottom edge of end panels 30, 40 push down into holes 72, 73 at each end of rim 54.

When end panels 30, 40 sit into place, holes 91 in the end of the base assembly in rim 54 and holes in end panel feet 32 are aligned and bamboo pins 90 are hammered through holes 91 and 32 and thus the whole system is locked together. Pinholes 91 are then covered by handles 60, and are therefore not visible. Bamboo pins 90 are typically 5 mm in diameter and 15 mm in length and are locked in place with marine PVA glue. However, this is not to be considered limiting and any glue could be used, or no glue as the pins are a tight fit, and on hammering into the holes they will lock. The ends of the pins preferably have a slight taper to assist with access into the holes.

A jute blanket (not shown) made from layers of jute fabric, with soft jute outside layers, and a pillow (not shown), preferably stuffed with bamboo sawdust, are placed inside coffin 100.

Lid 10 is held onto coffin 100 by bamboo toggles 95. Bamboo washers 96 are glued onto the top, i.e., exterior surface, of lid 10 around holes 97.

As shown in detail in FIG. 9, a T-shaped bamboo toggle 95 with the T-bar having an underside profile matching the dip in washer 96 is passed through washer 96 and hole 97 in lid 10 into hole 29 in the top edge of side panel 20*a*, 20*b*. As toggle 95 is turned a quarter turn, the bottom of toggle 95 locks to the side panel and clamps lid 10 and the side panel together. In its resting, unlocked, position, the underside profile of toggle 95 rests in the dip of washer 96.

Figure 2C:
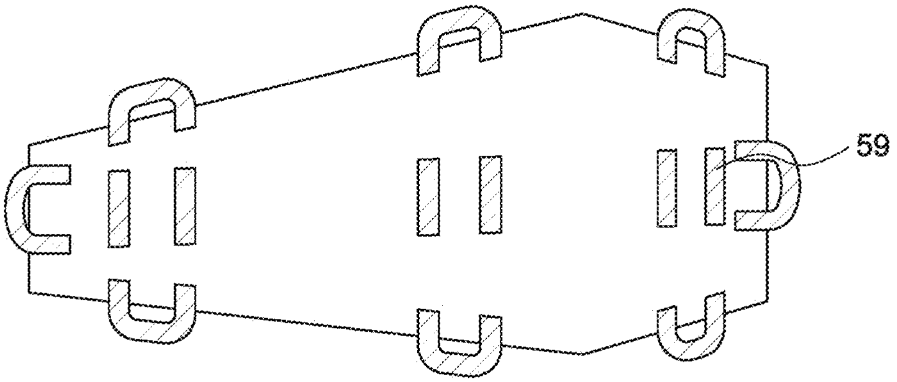
FIG. 2*c* shows a bottom view of the coffin of FIG. 1*a;*
Figure 2D:
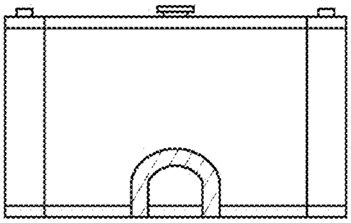
FIG. 2*d* shows an end view of the coffin of FIG. 1*a;*

As shown in FIG. 2*c*, 25 mm jute straps 59 weave through base assembly 50 and are load bearing. Alternatively, not shown in the drawings, the underside of the base assembly is provided by lateral grooves into which the jute straps lie.

In this unshown embodiment, the lateral grooves are preferably each independently about 40 mm wide and about 2 mm deep.

Figure 3A:
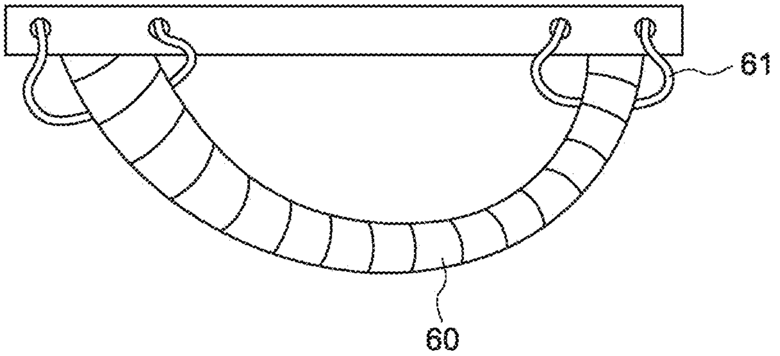
FIG. 3*a* shows the handle of the coffin of FIG. 1*a* pre-assembly of the coffin.
Figure 3B:
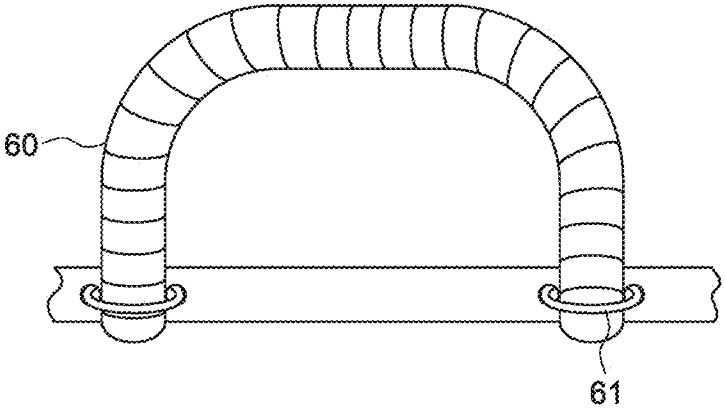
FIG. 3*b* shows the handle of FIG. 3*a* in an upright position after assembly of the coffin.

Handles 60 are rope handles made from multiple strands of jute and snap into place using simple jute string lasso 61 as shown in FIGS. 3*a* and 3*b*. Handles 60 are load bearing and hang for transport to reduce space required for transport of coffin 100 pre-assembly.

Figure 11:
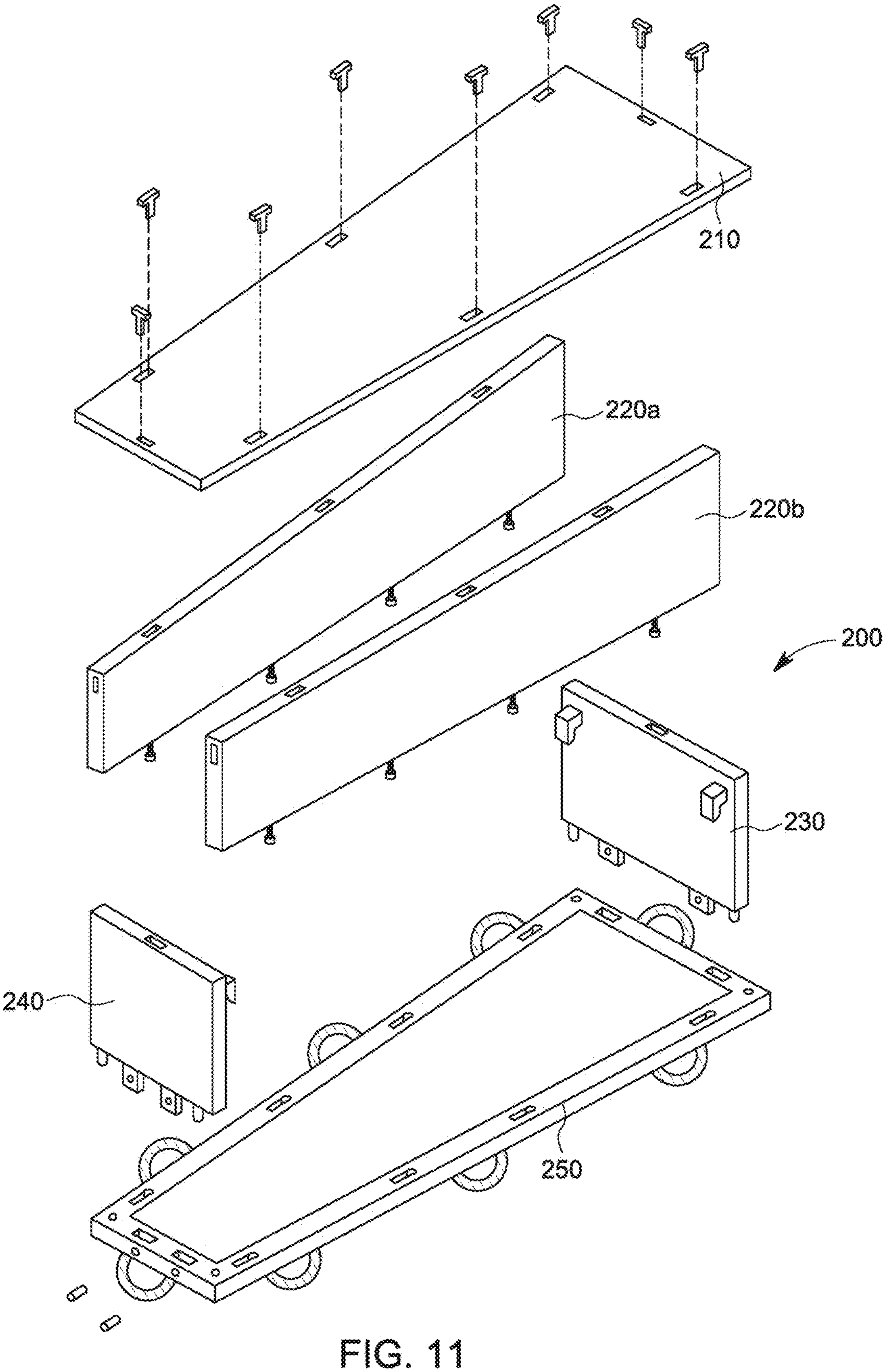
FIG. 11 shows an exploded perspective view of an alternative preferred embodiment of the environmentally friendly flat-pack coffin according to the invention.

FIG. 11 shows an alternative preferred environmentally friendly flat-pack coffin according to the invention, generally referred to herein by reference numeral 200 and comprising lid 210, right-hand side panel 220*a*, left-hand side panel 220*b*, foot end panel 230, head end panel 240 and base assembly 250 with handles.

Lid 210, right-hand side panel 220*a*, left-hand side panel 220*b*, foot end panel 230, head end panel 240 and base assembly 250 differ to lid 10, side panels 20*a*, 20*b* and end panels 30, 40 in shape alone.

As shown in FIG. 11, coffin 200 is wedge-shaped, with lid 210, side panels 220*a* and 220*b* and base assembly 250 each independently in the form of truncated triangles, end panel 230 being rectangular and head end panel 240 being substantially square-shaped.

Coffin 200 made from bamboo, jute and marine PVA glue has been successfully tested using the following testing protocol:

Load bearing compatibility: Deflection testing was conducted on coffin 200 with 190 kg for 24 hours. Upon testing, base assembly 250 showed minimum deflection.

Impact compatibility: Testing of lid 210 to simulate rocks being dropped onto coffin 200 in a grave.

Staircase testing: Coffin 200 carrying 190 kg was carried down a 45° slope using end handles only.

Ignition testing: This was conducted on a small piece of jute fabric. Modest burn speed resulted which avoids too rapid cremation burning of coffin 200.

Individual handle testing: up to 100 kg load per handle. Coffin 200 can be carried through doorways on end handle loading only.

Leak testing: prior to addition of the jute fabric layer and raised rim, 6 litres of water were left on coffin base 250 for 24 hours without leakage.

It will, of course, be understood that coffins 100 and 200 described herein is not limited to the particular dimensions or outline illustrated in the Figures. The coffin according to the invention may be any shape capable of containing a cadaver including but not limited to a conventional coffin shape or a casket. Furthermore, the component materials of the coffin according to the invention may be different to the ones set above, although in all cases the component materials are biodegradable and, ideally, environmentally sustainable. Furthermore, the material used for the side panels may be different to the material used for the end panels or lid and similarly the material used for the end panels may be different to the material used for the lid. Moreover, different materials may be used for different panels.

It is to be understood that the invention is not limited to the specific details described herein which are given by way of example only and that various modifications and alterations are possible without departing from the scope of the invention as defined in the appended claims.

The invention claimed is:

1. A flat-pack coffin made of environmentally friendly materials, the coffin comprising:

a lid;

a right-hand side panel;

a left-hand side panel wherein the right-hand side panel and the left-hand side panel have slots formed therein and have locking protrusions extending therefrom;

a foot end panel;

a head end panel, wherein the foot end panel and the head end panel contain connectors that engage the slots in the right-hand side panel and the left-hand side panel, and wherein the foot end panel and the head end panel have downwardly extending protrusions extending therefrom; and a base assembly having a layer of base slats, and a padded layer on the layer of base slats to form a resting surface for a corpse, wherein the resting surface has upstanding edges defining a rim around the perimeter thereof, the rim having a first plurality of apertures for accepting the downwardly extending protrusions and a second plurality of apertures for accepting the locking protrusions so as to secure the right-hand side panel and the left-hand side panel to the base assembly.

2. The flat-pack coffin of claim 1, wherein the lid, the right-hand side panel, the left-hand side panel, the foot end panel and the head end panel each independently comprise a fabric cover stretched over a frame of interconnected members, wherein the fabric cover is made of jute cloth, and the frame is made of bamboo.

3. The flat-pack coffin of claim 1, wherein the padded layer is made from cross member slats and longitudinal slats locked together with pins of sustainable material and interspersed with stuffed fabric bags.

4. The flat-pack coffin of claim 1, wherein each of the locking protrusions independently comprise a laterally extending nub, and the apertures on the rim for accepting the locking protrusions of the right-hand side panel and the left-hand side panel have a stepped cross-sectional internal profile such that the apertures narrow.

5. The flat-pack coffin of claim 1, wherein the right-hand side panel, the left-hand side panel, the foot end panel and the head end panel interconnect at corners and a single downwardly extending protrusion is located proximate each of the corners on the foot end panel and the head end panel and at least one downwardly extending protrusion is located in the center of each of the foot end panel and the head end panel.

6. The flat-pack coffin of claim 1, wherein the base assembly further comprises handles and wherein an attachment means run through the rim of the base assembly such that the attachment means can be pulled out and snapped over a handle to move the handle to a more upright position, wherein one or more of the downwardly extending protrusions are provided with an aperture for accepting the attachment means.

7. The flat-pack coffin of claim 6, wherein one or more fabric straps are woven through the layer of base slats of the base assembly to provide the attachment means and to further strengthen the base assembly of the coffin, wherein each of the fabric straps runs through a handle.

8. The flat-pack coffin of claim 1, wherein one or more of the downwardly extending protrusions are provided with a hole for accepting fastening means wherein the rim also has holes for accepting the fastening means, wherein the holes are orthogonal to the apertures for accepting the downwardly extending protrusions such that when the foot end panel and the head end panel sit into place, the apertures, the holes and downwardly extending protrusions are aligned.

9. The flat-pack coffin of claim 1, wherein each of the connectors is in the form of a hook with a tapered inside profile, wherein the hook is tapered such that the nominal angle is in the range of from about 15 degrees to about 35 degrees to the vertical.

10. The flat-pack coffin of claim 1, wherein the lid, the right-hand side panel and the left-hand side panel are provided with aligned apertures for accepting lid fastening means, wherein the aligned apertures are each independently surrounded by a washer having a dip for accepting a T-shaped toggle including a T-bar having an underside profile matching the dip in the washer.

11. The flat-pack coffin of claim 1, wherein the lid has the shape of a tapered hexagon and the right-hand side panel and the left-hand side panel have frames within a fabric cover, such that the fabric cover acts as a hinge to allow the frames to flex for flat packing.

* * * * *